US008300052B1

United States Patent
Hetu

(10) Patent No.: US 8,300,052 B1
(45) Date of Patent: Oct. 30, 2012

(54) APPLICATION OF BEVEL CURVES TO SPLINES

(75) Inventor: Alexis Hetu, Montreal (CA)

(73) Assignee: Autodesk, Inc., San Rafael, CA (US)

( * ) Notice: Subject to any disclaimer, the term of this patent is extended or adjusted under 35 U.S.C. 154(b) by 797 days.

(21) Appl. No.: 12/237,216

(22) Filed: Sep. 24, 2008

(51) Int. Cl.
G06T 11/20 (2006.01)
(52) U.S. Cl. ........................ 345/442; 345/441
(58) Field of Classification Search .................. 345/442, 345/441; 382/113
See application file for complete search history.

(56) References Cited

U.S. PATENT DOCUMENTS

| 5,410,645 | A  | * | 4/1995  | Ooka et al. ............... 345/442 |
| 7,817,164 | B2 | * | 10/2010 | Shirahata et al. ........... 345/619 |
| 2007/0195095 | A1 | * | 8/2007  | Gerhard et al. ............. 345/467 |
| 2007/0211081 | A1 | * | 9/2007  | Quadling et al. ............ 345/632 |

OTHER PUBLICATIONS

Mordy Golding, Real World Adobe Illustrator CS2, Peachpit Press, 2006.*

* cited by examiner

Primary Examiner — James A Thompson
Assistant Examiner — Fikru Gennene
(74) Attorney, Agent, or Firm — Fish & Richardson P.C.

(57) ABSTRACT

The present disclosure includes, among other things, systems, methods and program products for application of bevel curves to splines.

21 Claims, 9 Drawing Sheets

APPLICATION OF BEVEL CURVES TO SPLINES

BACKGROUND

Some computer aided design programs allow users to create custom geometries by extruding two-dimensional splines into three dimensions. An extruded geometry can be shaped by applying a bevel curve to the geometry. However, doing so can result in unwanted deformations such as bumps protruding from the geometry. In addition, bevel curves cannot typically be easily applied to self-intersecting splines.

SUMMARY

In general, one aspect of the subject matter described in this specification can be embodied in a method that includes a computer-implemented method, comprising applying a first spline to a second spline that is closed to create a third spline, where the third spline is closed and has the shape of the second spline as modified by the first spline. One or more points of self intersection are detected in the third spline and the third spline is divided into one or more sections at the points of self intersection. A first section is removed from the third spline where the first section includes two non-overlapping segments, a first segment having crossed a second segment as a result of the applying. Other embodiments of this aspect include corresponding systems, apparatus, and computer program products.

These and other embodiments can optionally include one or more of the following features. The first segment has an normal that is outward pointing in the second spline and inward pointing in the third spline. The first spline is applied to one side of the second spline. The first spline is closed. The third spline is extruded to form a solid. The third spline is associated with a neighbor spline. The third spline and the neighbor spline each have a plurality of vertices, the method further comprising linking corresponding vertices on the third spline and the neighbor spline to create a geometry comprising a plurality of polygons. The geometry has an opening, the method further comprising filling the opening with one or more polygons.

Particular embodiments of the subject matter described in this specification can be implemented to realize one or more of the following advantages. Custom geometries can be created by applying bevel curves to self-intersecting splines and extruding the resulting spline. Undesirable deformations that result from application of bevel curves to splines are automatically removed. Holes left by removal of deformations can be automatically filled with various geometries.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
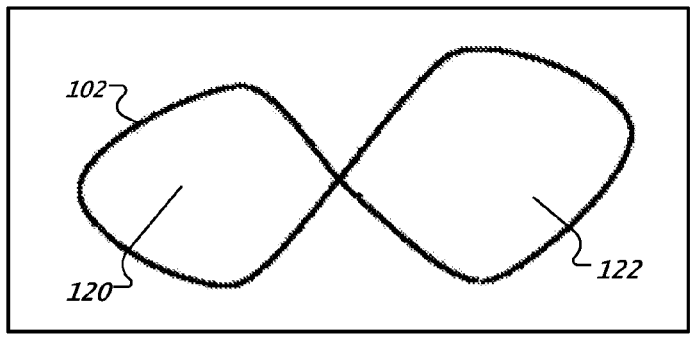
FIG. 1A illustrates an example spline.

FIG. 1A illustrates an example two-dimensional (2D) spline curve 102 (or "spline"). In various implementations, the spline 102 can be described by a function or a set of functions and by a set of tangents. In further implementations, the spline 102 can be manipulated through the set of tangents and/or a set of control points, for example. The spline 102 can be created, for example, using a CAD (Computer Aided Drafting) program.

Figure 1B:
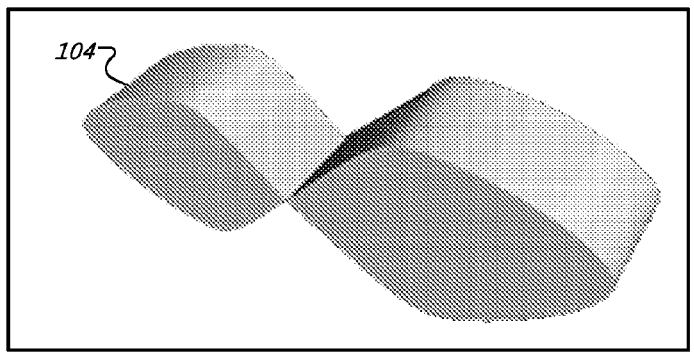
FIG. 1B illustrates an example extruded shape.

The spline 102 in this example is a closed spline. A closed spline is a spline that has an interior (i.e., a closed spline is connected end-to-end). The spline 102 is a self-intersecting spline. A self-intersecting spline includes line segments that cross each other. The spline 102 can be used as a basis for custom geometry. For an example, FIG. 1B illustrates an extruded shape 104 based off of the spline 102. The spline 102 can be extruded to create the three-dimensional (3D) extruded shape 104. For example, the extruded shape 104 has the same general shape as the spline 102 but has a depth (e.g., the extruded shape 104 is a 3D solid).

Figure 1C:
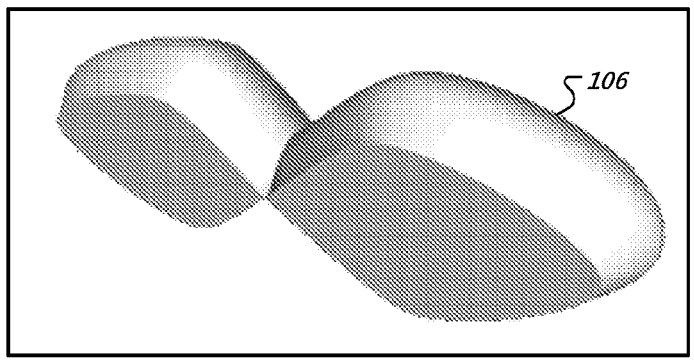
FIG. 1C illustrates an example beveled shape.
Figure 1C:
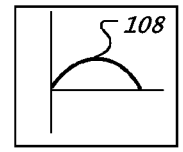

As shown in FIG. 1C, a beveled shape 106 can be created by applying a bevel curve 108 to the extruded shape 104. In various implementations, a bevel curve is a spline. By way of illustration, a bevel curve can curve upward (e.g., 108) or downward (e.g., 112). Other bevel curves are possible. The bevel curve 108 can, for example, be drawn or otherwise defined using a CAD program. In some implementations, the bevel curve 108 is applied to one side of the extruded shape 104, for example to the top or bottom of the extruded shape 104. Applying the bevel curve 108 to the extruded shape 104 shapes the extruded shape 104 to create the beveled shape 106 (i.e., the beveled shape 106 is a version of the extruded shape 104 with surfaces modified according to the shape of the bevel curve 108).

Figure 1D:
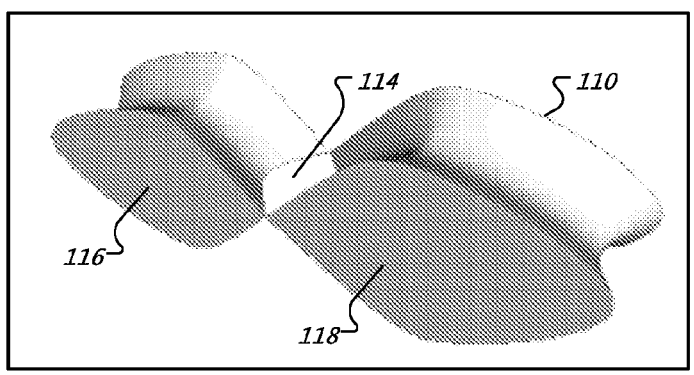
FIG. 1D illustrates an example beveled shape which includes a hole.
Figure 1D:
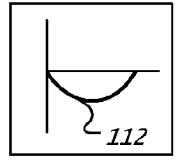

FIG. 1D illustrates a beveled shape 110 created from applying a bowl-shaped bevel curve 112 to the extruded shape 104. As a result of applying the bevel curve 112 to the extruded shape 104, a "bulge" or "bump" may appear on the underside of the extruded shape 104. That is, part of the extruded shape 104 may be "pushed" to the other side as the bevel curve 112 is applied. The "bump", which can be considered a distortion, can be removed, creating a hole 114. Faces 116 and 118 of the beveled shape 110 correspond to sections 120 and 122 of the spline 102, respectively (i.e., with the sections 120 and 122 resulting from the self intersection of the spline 102).

Figure 2A:
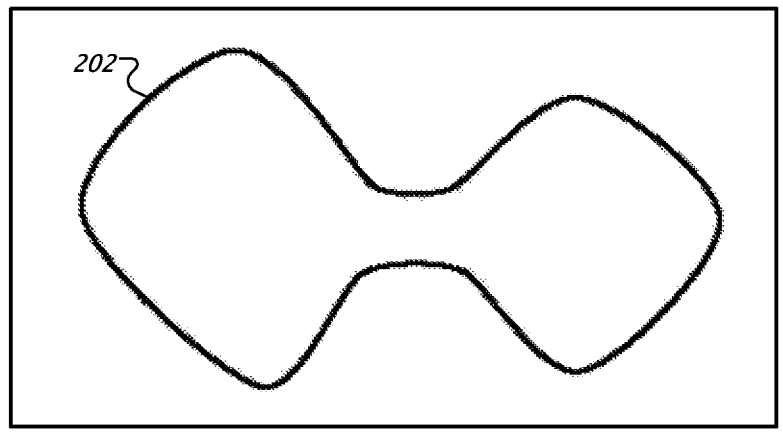
FIG. 2A illustrates an example non-intersecting, two-dimensional spline.
Figure 2B:
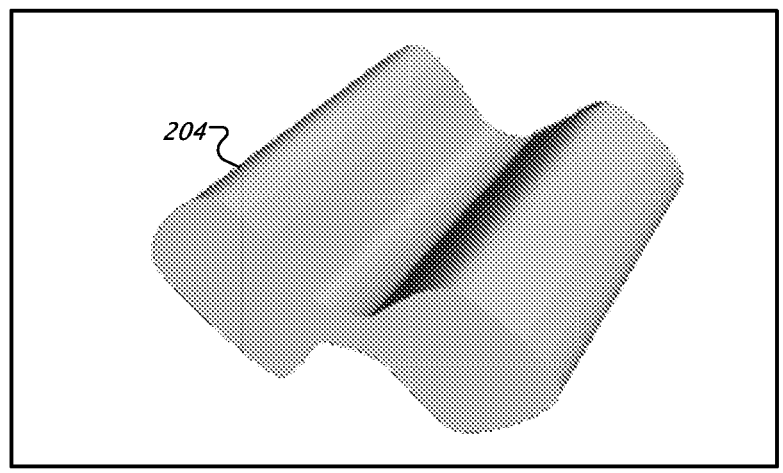
FIG. 2B illustrates an example extruded shape.
Figure 2C:
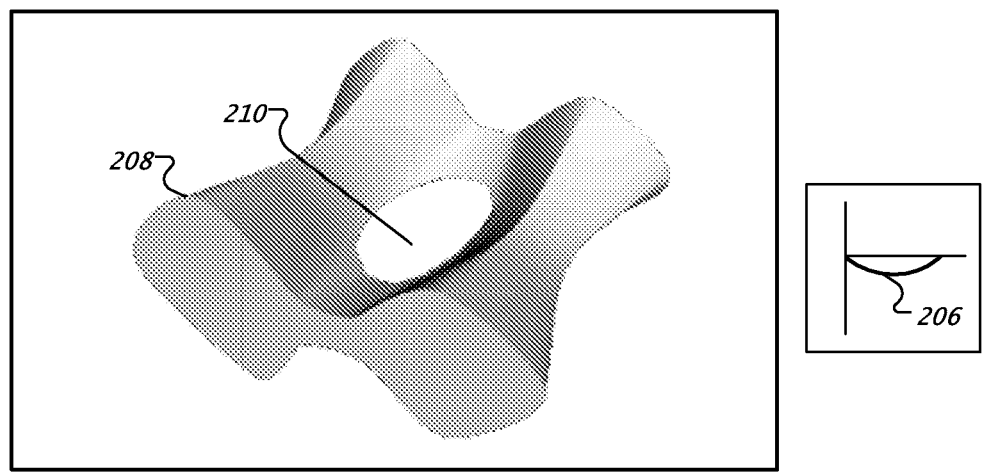
FIG. 2C illustrates an example beveled shape.

FIG. 2A illustrates a closed, non-intersecting spline 202. The spline 202 is non-intersecting because none of the line segments of the spline 202 cross one another. As shown in FIG. 2B, the spline 202 can be extruded to create an extruded shape 204. As shown in FIG. 2C, a bevel curve 206 can be applied to the extruded shape 204 to create a beveled shape 208. As a result of applying the bevel curve 206 to the extruded shape 204, a bulge can form on the underside of the beveled shape 208. The bulge can be removed, resulting in a hole 210. FIGS. 2C and 1D illustrate that applying a bevel curve to an extruded shape that is based off of a 2D spline can result in the formation of a bulge on the extruded shape (which can be subsequently removed, forming one or more holes), regardless of whether the 2D spline is self-intersecting or non-intersecting.

Figure 3A:
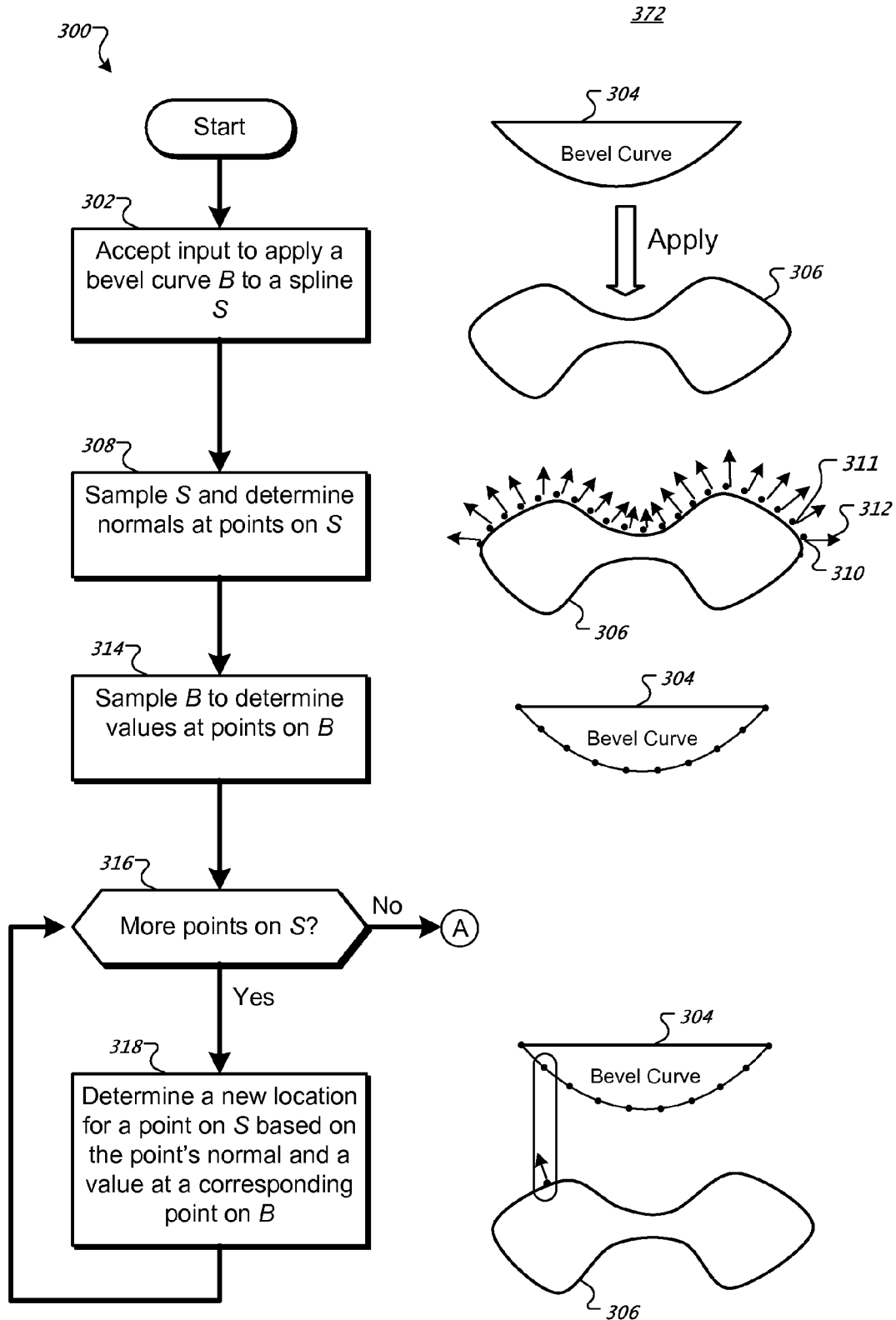
FIGS. 3A-3C illustrate an example process for applying a bevel curve to a spline.
Figure 3B:
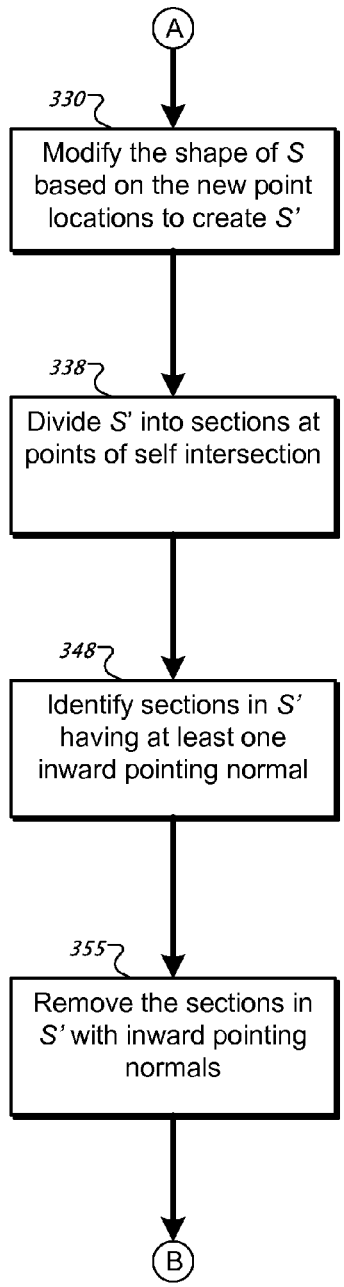
Figure 3B:
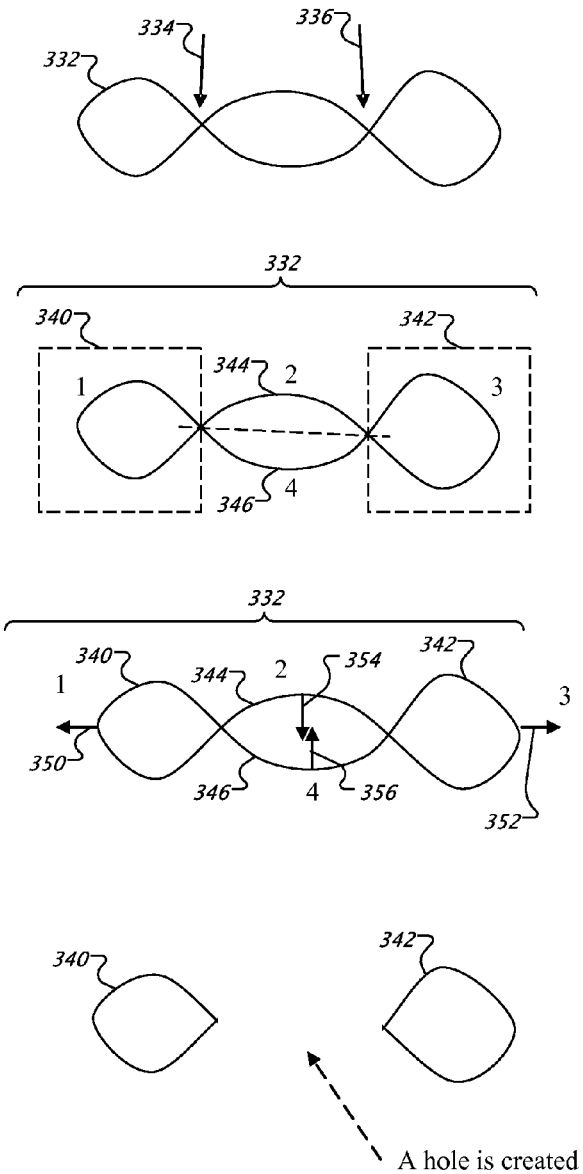
Figure 3C:
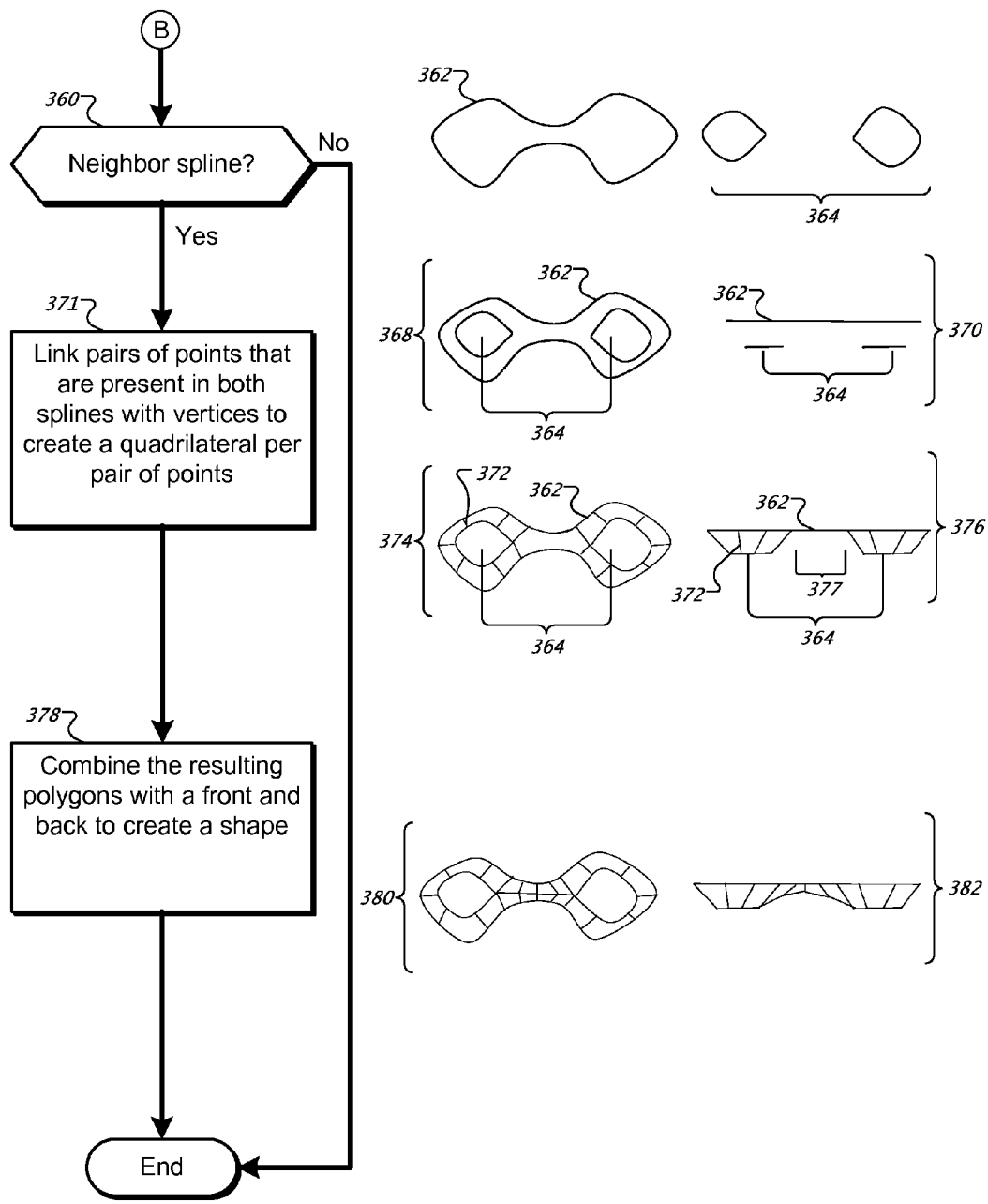

FIGS. 3A-3C illustrate an example process 300 applying a bevel curve to a spline. The process 300 begins when an input is accepted to apply a bevel curve B to a spline S (step 302). For example, an input can be accepted from a user interface of a CAD program to apply a bevel curve 304 to a closed, non-intersecting spline 306. As another example, an input can be received from another process (e.g., without direct user input). The bevel curve 302, as well as the spline 304, can be defined using an expression which includes points and tangents.

The spline S is sampled and normal points are determined at points on the spline S (step 308). For example, points, such as example points 310 and 311, can be sampled on the spline 306. In various implementations, points are sampled at a pre-determined spacing from one another (with the total number of sample points varying based on the size of the spline S). In further implementations, a pre-determined number (e.g., 1,000) of sample points are determined. Outward-pointing normal vectors (e.g., vectors perpendicular to the spline 306), such as a vector illustrated by arrow 312, can be computed for each of the points sampled on the spline 306. Other ways of determining the points are possible.

The bevel curve B is sampled to determine a value at points on the bevel curve B (step 314). In various implementations, the bevel curve 304 is sampled at the same rate or spacing as the sampling of the spline 306 performed in step 308. In further implementations, the bevel curve 304 and the spline 306 are sampled at different rates or spacings. For each sample of the bevel curve 304, a bevel curve value can be determined, where the bevel curve value indicates whether the spline is curving upward or downward at the given sample point. Bevel curve values can be stored in a table. For example, for each sampled point of the bevel curve 304, the X and Y location of the point can be compared to the X and Y location of the previous sampled point. If the sampled point has a Y value greater than the previous sampled point, a positive value can be stored in the table. If the sampled point has a Y value below the previous sampled point, a negative value can be stored in the table. Next, it is determined whether there are more points on the spline S (step 316). For example, all determined points on the spline 306 can be processed in a processing loop, and a test can be performed to determine whether there are more sample points on the spline 306 to process.

If there are more points on the spline S, a new location is determined for a point on the spline S based on the point's normal and a value at a corresponding point on the bevel curve B (step 318). For example, a new location can be determined for a sampled point on the spline 306 based on a corresponding sample point on the bevel curve 304. In various implementations, or a point on the spline 306 a new location for the point can be determined based on the following formula:

$$new\_location = original\_location + |normal| * corresponding\_bevel\_curve\_value.$$

Other ways of determining the new location are possible. The new location calculation can move the spline sampled point in the direction of the normal for positive bevel curve values, and away from the normal for negative bevel curve values. In other words, a positive bevel curve value may "pull up" on a spline point and a negative bevel curve value may "push down" on a spline point.

If there are no more points on the spline S (i.e., step 316), the shape of the spline S is modified based on the new point locations to create a new spline S' (step 330). For example, a spline 332 illustrates the movement of the spline 306 according to the new point locations calculated in step 318. The spline 332 has two points (334, 336) of self intersection.

The spline S' is divided into sections at points of self intersection (step 338). For example, the spline 332 can be divided into sections at the points 334 and 336, resulting in the sections 340-346.

Sections in the spline S' having at least one inward pointing normal are identified (step 348). In various implementations, the normals computed in step 308 can be examined with respect to the spline 332 to determine which sections have at least one inward pointing normal. For example, for the sections 340 and 342, it may be determined that all corresponding normals are outward pointing (e.g., normals 350, 352) and for the sections 344 and 346 it may be determined that each section has at least one corresponding inward pointing normal (e.g., normals 354, 356).

The sections in the spline S' with inward pointing normals are removed (step 355). For example, for the spline 332, the sections 344 and 346 having at least one inward pointing normal may be removed.

It is determined whether there is a neighbor spline condition (step 360). A neighbor spline condition can occur if one or more splines are located adjacent to (e.g., in front or behind another spline). In other words, a neighbor spline condition can exist if a shape is based on one or more splines. In a neighbor spline condition, an extrusion can be performed by connecting vertices of neighboring splines to create a three-dimensional, possibly asymmetrical shape. For example, a spline 362 may be a neighbor spline to a spline 364. The spline 364 may be in front of the spline 362, as illustrated by a front view 368 and an overhead view 370.

If a neighbor spline condition exists, pairs of points that are present in a pair of neighbor splines are linked with vertices to create a quadrilateral per pair of points (step 371). For example, a line segment 372 (along with various other line segments) links a vertex on the spline 362 to a vertex on the spline 364, as illustrated by a front view 374 and an overhead view 376. The overhead view 376 illustrates an "opening" 377, which results because there are no vertices on the spline 364 to link to corresponding vertices on the spline 362.

The resulting polygons with a front and back are combined to create a shape (step 378), thereby ending the process 300. For example, openings can be filled through line-plane intersections to create a shape based on the splines 362 and 364, as illustrated in a front view 380 and an overhead view 382.

Figure 4:
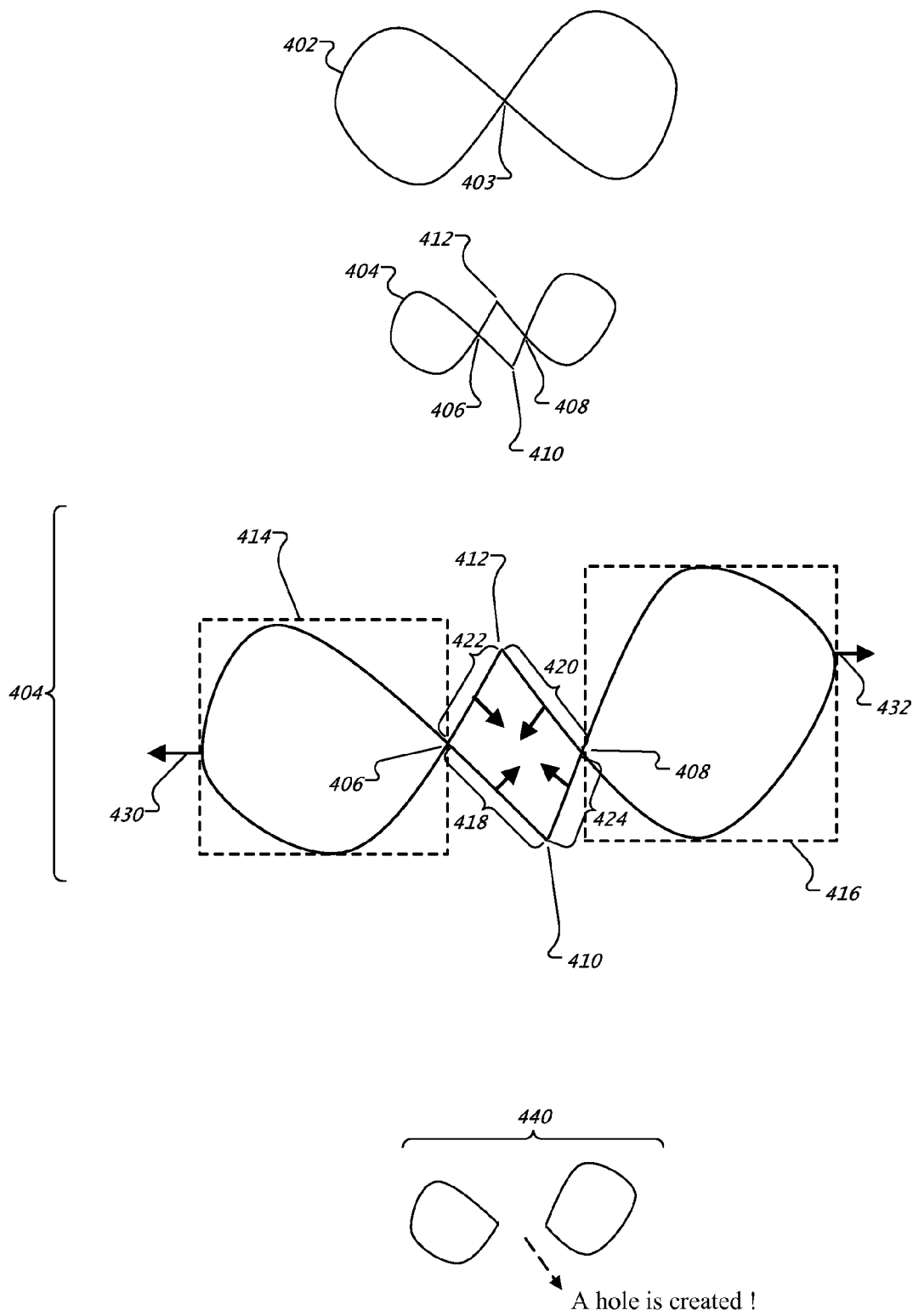
FIG. 4 illustrates the removal of a section of a self-intersecting spline.

FIG. 4 illustrates the removal of a section of a self-intersecting spline 402. The self-intersecting spline 402 includes an intersection 403. To apply a bevel curve to the self-intersecting spline 402, normals are computed and a shrinking process is applied to the spline 402, according to the process described in FIG. 3. The shrinking process can result in the creation of a new spline 404. The new spline 404 may include intersections (e.g., 406, 408) which were not in the spline 402. In contrast, intersections 410 and 412 are intersections from the spline 402 (i.e., intersections 410-412 result from, or are otherwise associated with the intersection 403).

Sections of the spline 404 are created based on points of intersection. For example, sections 414-424 are created, with section boundaries existing at the intersections 406-412. Previously-computed normals are examined for each section. Sections which only have outward pointing normals (e.g., sections 414 and 416, with outward pointing normals 430 and 432) are identified as sections to keep. Sections with one or more inward pointing normals (e.g., sections 418-424) are removed from the spline 404. A spline 440 is created as a result of the section removal.

Figure 5:
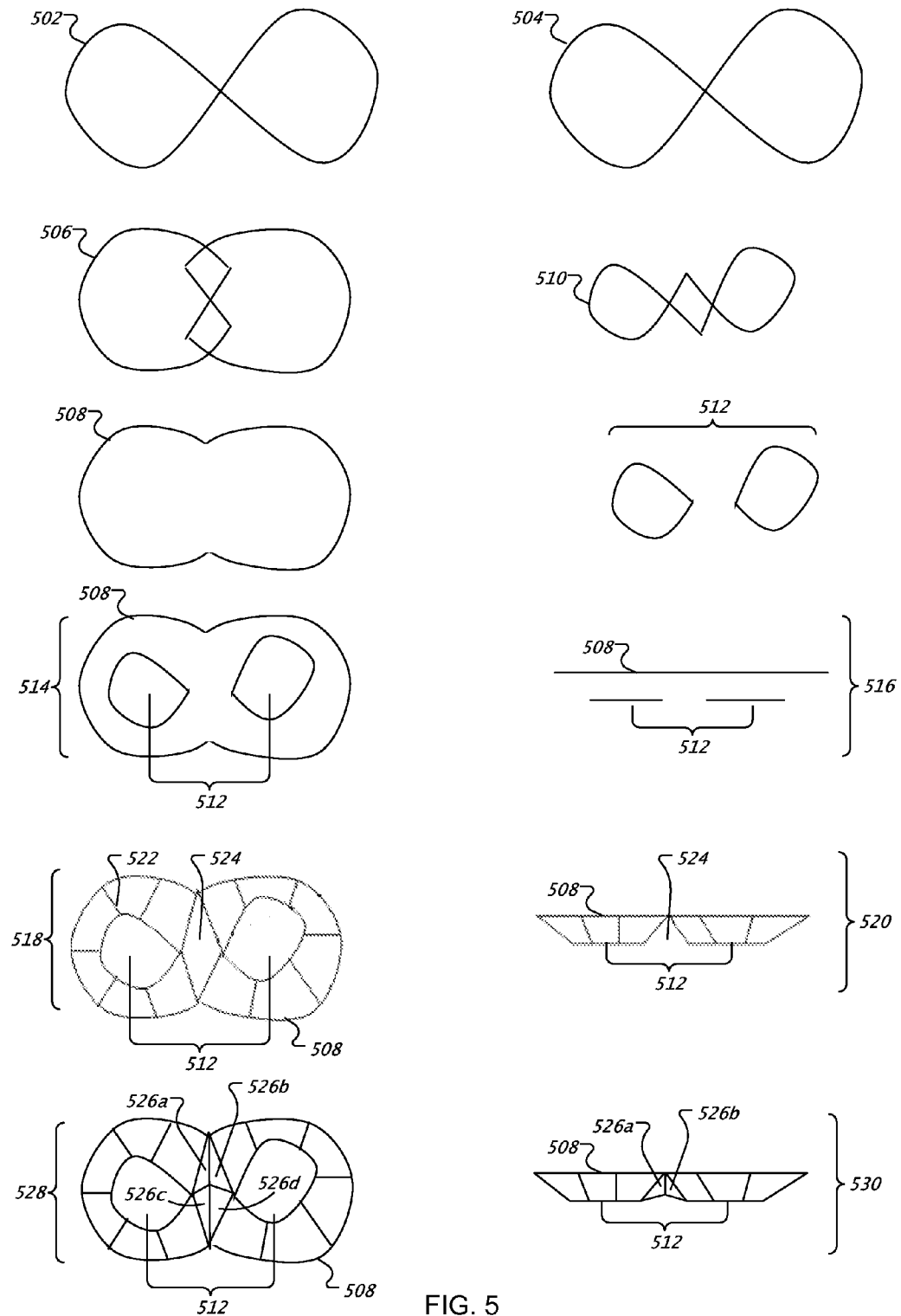
FIG. 5 illustrates processing of neighbor splines.

FIG. 5 illustrates processing of neighbor splines. Self-intersecting splines 502 and 504 are neighbor splines which are equal prior to being bevel-deformed and may be used as a base geometry (e.g., a shape based on splines 502 and 504 may be extruded and/or beveled). A bevel curve is applied to spline 502 to enlarge sections of it, the resulting spline 506 is created. Sections of the spline 506 with inward pointing normals are removed, as described in FIG. 3, resulting in the spline 508.

Similarly, spline 504 is processed using a shrinking process as described in FIG. 3, and spline 510 is created as a result. Sections of the spline 510 with inward pointing normals are removed, as described in FIG. 3, resulting in the spline 512. A front view 514 and an overhead view 516 show the spline 512 in front of the spline 508.

As illustrated in a front view 518 and an overhead view 520, and as described in FIG. 3, polygons are created by linking corresponding vertices on the splines 508 and 512. For example, a line segment 522 (along with various other line segments) links a vertex on the spline 508 with a vertex on the spline 512.

In this example, a diamond-shaped hole 524 exists after polygon creation. The hole 524 can be filled or partially filled using triangles 526a-d created using a middle-point computed by a grow/shrink ratio, for instance, as illustrated in a front view 528 and an overhead view 530.

Figure 6:
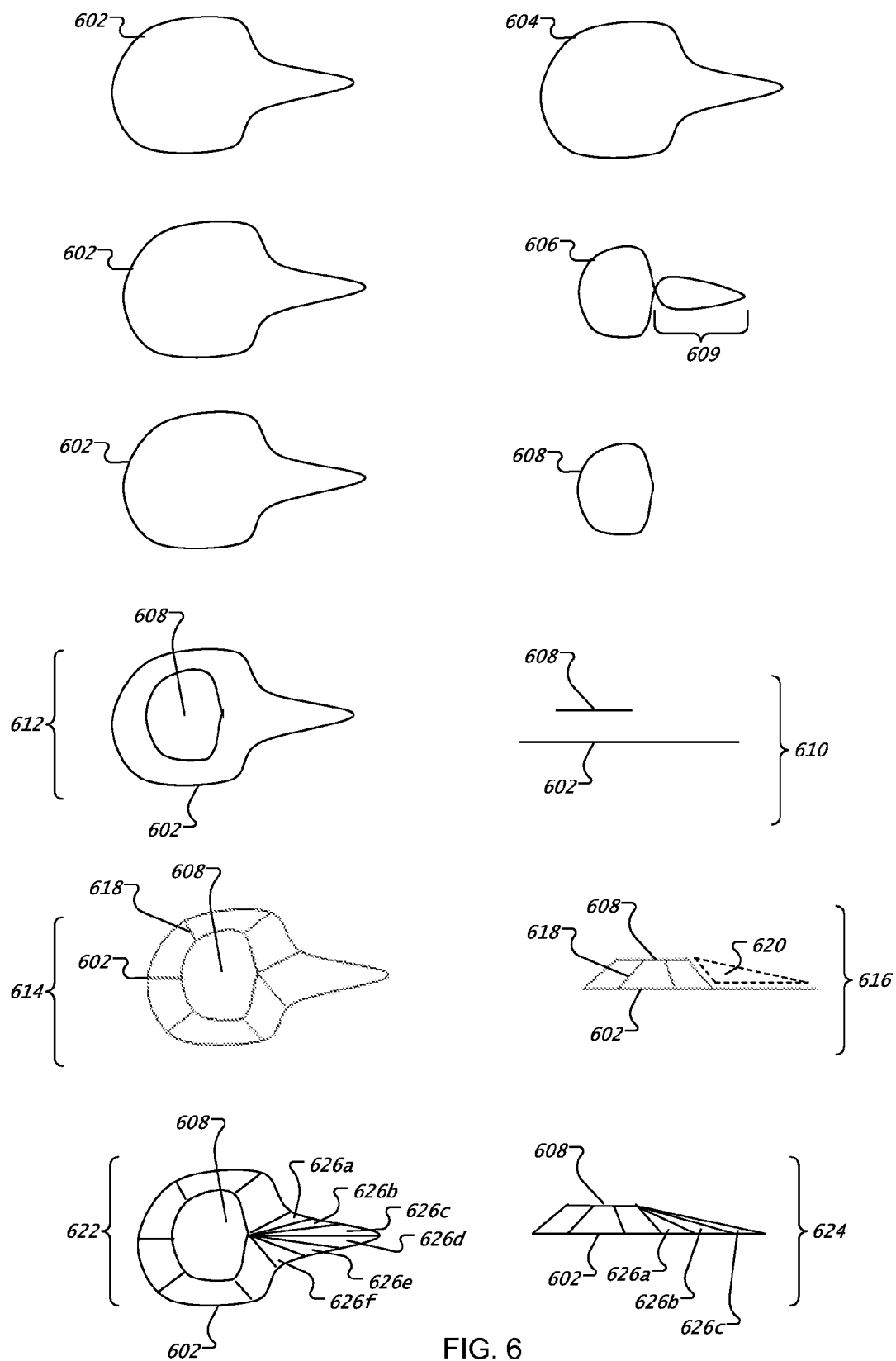
FIG. 6 illustrates processing of a loop section of a spline.

FIG. 6 illustrates processing of a loop section. Non self-intersecting splines 602 and 604 are neighbor splines and a shape based on the neighbor splines 602 and 604 may be used as a base geometry (e.g., a shape based on splines 602 and 604 may be extruded and/or beveled). Spline 602 is processed using a shrinking process as described in FIG. 3, and spline 606 is created as a result. Sections of the spline 606 with inward pointing normals are removed, as described in FIG. 3, resulting in the spline 608. In particular, the loop section 609 has been removed.

An overhead view 610 shows the spline 602 in front of the spline 608. A front view 612 shows the spline 608 in front of the spline 602. As illustrated in a front view 614 and in an overhead view 616, and as described in FIG. 3, polygons are created by linking corresponding vertices on the splines 602 and 608. For example, a line segment 618 (along with various other line segments) links a vertex on the spline 602 with a vertex on the spline 608.

The absence of the section 609 in the spline 608 results in the formation of a "hole" (indicated by a dashed-line triangle-shaped area 620) due to the absence of vertices to connect to the spline 602. The "hole" indicated by area 620 can be filled by attaching all remaining vertices with the new intersection on the shrunken spline 608, resulting in the creation of several triangles. For example, a front view 622 and an overhead view 624 illustrate the creation of triangles 626a-f.

Figure 7:
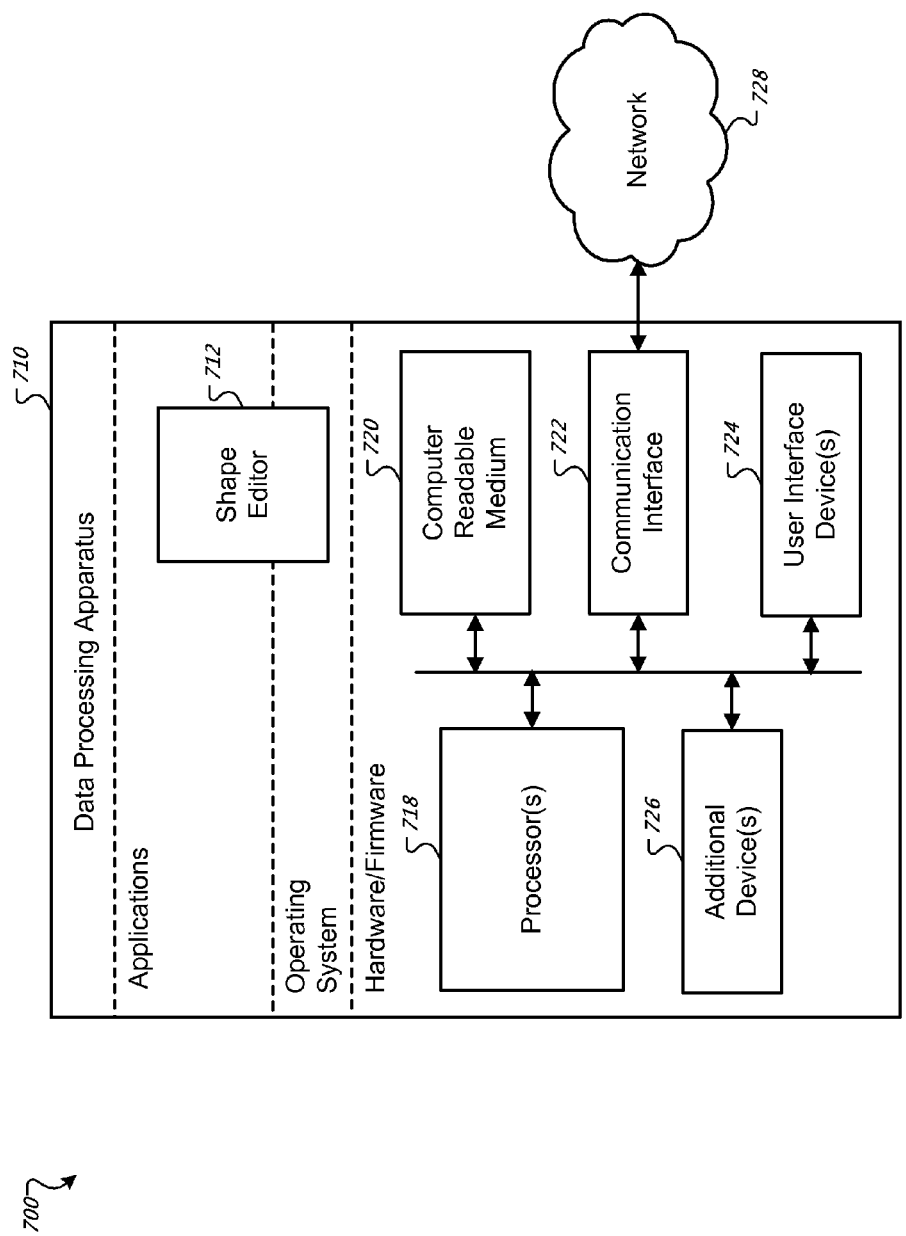
FIG. 7 is a block diagram showing an example system configured to apply a bevel curve to a spline.

FIG. 7 shows an example system 700 configured to apply a bevel curve to a spline. A data processing apparatus 710 includes hardware/firmware, an operating system and one or more applications or application modules, including a shape editor 712. As used within this specification, the term "application" refers to a computer program that the user perceives as a distinct computer tool used for a defined purpose. The shape editor 712 can be built entirely into the operating system (OS) of the data processing apparatus 710, or the shape editor 712 can have different components located in different locations (e.g., one portion in the OS or kernel mode, one portion in the user mode, and one portion in a remote server), and the shape editor 712 can be built on a runtime library serving as a software platform of the apparatus 710. Moreover, the shape editor 712 can be a graphical user interface application (e.g., a Web browser) that connects to one or more processors 718 (e.g., one or more Web servers) over a network 728 and provides the computer tool as a network service. In various implementations, the shape editor 712 can be a recipient application that can receive one or more user inputs corresponding to applying a bevel curve to a spline.

The shape editor 712 includes machine-readable instructions that, when executed, present a representation of one or more shapes and/or splines to be displayed on the data processing apparatus 710. The shape editor 712 can accept a first input to identify a bevel curve spline, and a second input to identify a spline to apply the bevel curve spline to.

The data processing apparatus 710 includes one or more processors 718 and at least one computer-readable medium 720. The at least one computer-readable medium 720 can include a random access memory (RAM), a program memory (for example, a writable read-only memory (ROM) such as a flash ROM), a hard drive, and a removable disk drive (e.g., a floppy disk, compact disk (CD), or digital versatile disk (DVD) drive). All such computer-readable media can be suitable for storing executable or interpretable computer programs, including programs or application components embodying aspects of the subject matter described in this specification. In addition, the data processing apparatus 710 can include a hard drive controller, a video controller, and an input/output (I/O) controller coupled by a system bus. The apparatus 710 can be preprogrammed, in ROM, for example, or it can be programmed (and reprogrammed) by loading a program from another source (for example, from a floppy disk, a CD-ROM, DVD, or another computer).

The data processing apparatus 710 can also include one or more input/output (I/O) interface devices, such as a wireless and/or wireline communication interface 722, one or more user interface devices 724, and one or more additional devices 726. The data processing apparatus can communicate using the communication interface 722 over network 728 according to the type of communication implemented by the network 728. For example, the communication interface 722 can communicate using a wireless Bluetooth session, a wireline USB session, a TCP/IP session (both wireless and wireline), a wireless infra-red (IR) session, or other communication sessions using the appropriate network. That is, network 728 may be a Bluetooth network, a USB network, TCP/IP network, an IR network, or a variety of other types of networks.

Once programmed as described in this specification, the data processing apparatus 710 is operable to provide shape editing functionality using any of the techniques described in this specification.

Various implementations of the systems and techniques described in this specification can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the subject matter have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method implemented by data processing apparatus, the method comprising:
  applying a first spline to a second spline that is closed to create a third spline, wherein the third spline is closed and has the shape of the second spline as modified by the first spline, and wherein applying the first spline to the second spline comprises determining a plurality of different positions wherein each of the positions is calculated based on, at least, a respective curve value of a point on the first spline and a normal of a corresponding respective point on the second spline, wherein the third spline intersects each of the positions;
  detecting one or more points of self-intersection in the third spline and dividing the third spline into one or more distinct sections at the detected points of self-intersection;
  detecting a that first section of the one or more distinct sections includes a first segment and a second segment that do not overlap, wherein the first segment has a normal that is outward pointing in the second spline and inward pointing in the third spline, and wherein the first segment crossed the second segment as a result of the applying;
  removing the detected first section from the third spline based on detecting the first section; and
  wherein applying, detecting and removing are performed by the data processing apparatus.

2. The method of claim 1 where the first spline is applied to one side of the second spline.

3. The method of claim 1 where the first spline is closed.

4. The method of claim 1, further comprising extruding the third spline to form a solid.

5. The method of claim 1 where the third spline is associated with a neighbor spline.

6. The method of claim 5 where the third spline and the neighbor spline each have a plurality of vertices, the method further comprising linking corresponding vertices on the third spline and the neighbor spline to create a geometry comprising a plurality of polygons.

7. The method of claim 6 where the geometry has an opening, the method further comprising filling the opening with one or more polygons.

8. A system comprising: data processing apparatus; and a computer readable storage device storing instructions that, when executed by the data processing apparatus, cause the data processing apparatus to perform operations comprising:
  applying a first spline to a second spline that is closed to create a third spline, wherein the third spline is closed and has the shape of the second spline as modified by the first spline;
  detecting one or more points of self-intersection in the third spline and dividing the third spline into one or more distinct sections at the detected points of self-intersection, and wherein applying the first spline to the second spline comprises determining a plurality of different positions wherein each of the positions is calculated based on, at least, a respective curve value of a point on the first spline and a normal of a corresponding respective point on the second spline, wherein the third spline intersects each of the positions; and
  detecting that a first section of the one or more distinct sections includes a first segment and a second segment that do not overlap, wherein the first segment has a normal that is outward pointing in the second spline and inward pointing in the third spline, and wherein the first segment crossed the second segment as a result of the applying; and
  removing the detected first section from the third spline based on detecting the first section.

9. The system of claim 8 where the first spline is applied to one side of the second spline.

10. The system of claim 8 where the first spline is closed.

11. The system of claim 8 where the operations further comprise extruding the third spline to form a solid.

12. The system of claim 8 where the third spline is associated with a neighbor spline.

13. The system of claim 12 where the third spline and the neighbor spline each have a plurality of vertices, the system further comprising linking corresponding vertices on the third spline and the neighbor spline to create a geometry comprising a plurality of polygons.

14. The system of claim 13 where the geometry has an opening, the system further comprising filling the opening with one or more polygons.

15. A computer program product, stored on a computer-readable device that, when executed, cause data processing apparatus to perform operations comprising:

applying a first spline to a second spline that is closed to create a third spline, wherein the third spline is closed and has the shape of the second spline as modified by the first spline, and wherein applying the first spline to the second spline comprises determining a plurality of different positions wherein each of the positions is calculated based on, at least, a respective curve value of a point on the first spline and a normal of a corresponding respective point on the second spline, wherein the third spline intersects each of the positions;

detecting one or more points of self-intersection in the third spline and dividing the third spline into one or more distinct sections at the detected points of self-intersection;

detecting that a first section of the one or more distinct sections includes a first segment and a second segment that do not overlap, wherein the first segment has a normal that is outward pointing in the second spline and inward pointing in the third spline, and wherein the first segment crossed the second segment as a result of the applying; and removing the detected first section from the third spline based on detecting the first section.

16. The program product of claim 15 where the first spline is applied to one side of the second spline.

17. The program product of claim 15 where the first spline is closed.

18. The program product of claim 15 where the operations further comprise extruding the third spline to form a solid.

19. The program product of claim 15 where the third spline is associated with a neighbor spline.

20. The program product of claim 19 where the third spline and the neighbor spline each have a plurality of vertices, the program product further comprising linking corresponding vertices on the third spline and the neighbor spline to create a geometry comprising a plurality of polygons.

21. The program product of claim 20 where the geometry has an opening, the program product further comprising filling the opening with one or more polygons.

* * * * *

UNITED STATES PATENT AND TRADEMARK OFFICE
CERTIFICATE OF CORRECTION

Page 1 of 1

PATENT NO.        : 8,300,052 B1
APPLICATION NO.   : 12/237216
DATED             : October 30, 2012
INVENTOR(S)       : Alexis Hetu It is certified that error appears in the above-identified patent and that said Letters Patent is hereby corrected as shown below:

On Col. 8, line 7 (Claim 1), delete "a that" and insert -- that a --, therefor.

Signed and Sealed this
Twenty-second Day of January, 2013

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,300,052 B1 | Page 1 of 1 |
| APPLICATION NO. | : 12/237216 | |
| DATED | : October 30, 2012 | |
| INVENTOR(S) | : Hetu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 923 days.

Signed and Sealed this
Ninth Day of September, 2014

Michelle K. Lee
*Deputy Director of the United States Patent and Trademark Office*